US007245173B2

(12) United States Patent
Krasnansky

(10) Patent No.: US 7,245,173 B2
(45) Date of Patent: Jul. 17, 2007

(54) METHOD TO REDUCE INTEGRATED CIRCUIT POWER CONSUMPTION BY USING DIFFERENTIAL SIGNALING WITHIN THE DEVICE

(75) Inventor: Keith Krasnansky, Germantown, MD (US)

(73) Assignee: Texas Instruments Incorporated, Dallas, TX (US)

( * ) Notice: Subject to any disclaimer, the term of this patent is extended or adjusted under 35 U.S.C. 154(b) by 45 days.

(21) Appl. No.: 10/919,137

(22) Filed: Aug. 16, 2004

(65) Prior Publication Data

US 2006/0033558 A1   Feb. 16, 2006

(51) Int. Cl.
*H03K 17/16* (2006.01)
(52) U.S. Cl. ..................... 327/379; 327/565
(58) Field of Classification Search ............... 327/291, 327/292, 293, 294, 297, 299, 379, 391, 564, 327/565
See application file for complete search history.

(56) References Cited

U.S. PATENT DOCUMENTS 5,987,543 A * 11/1999 Smith ..................... 710/70
6,433,606 B1 * 8/2002 Arai ......................... 327/291
6,693,801 B2 * 2/2004 Otsuka ...................... 361/763
6,735,130 B2 * 5/2004 Fan et al. ................... 365/198
6,836,290 B1 * 12/2004 Chung et al. .............. 348/294
6,909,127 B2 * 6/2005 O'Mahony et al. ......... 257/208
6,943,588 B1 * 9/2005 Luo et al. .................... 326/86

* cited by examiner

Primary Examiner—Jeffrey Zweizig
(74) Attorney, Agent, or Firm—Steven A. Shaw; W. James Brady; Frederick J. Telecky, Jr.

(57) ABSTRACT

A method of power consumption reduction in integrated circuits comprising extensive use of differential signaling within said circuits. Differential signaling comprises a pair of coupled, symmetrically opposite and operatively dependent electronic signals each driven by voltages of the same magnitude, but of opposite polarity with respect to a common ground. The drive voltages of each signal are of relatively low potential as compared to the core operating voltage of present day devices. The low-voltage pair of signals tends to create offsetting fields of electromagnetic interference from the flow of current within their respective conductors which tends to minimize inductive effects (and therefore corruption of signals) in adjacent signal lines. Differential signaling replaces all or as many single-end signals as possible throughout the device resulting in relatively lower power usage as compared to present devices.

5 Claims, 1 Drawing Sheet

METHOD TO REDUCE INTEGRATED CIRCUIT POWER CONSUMPTION BY USING DIFFERENTIAL SIGNALING WITHIN THE DEVICE

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The present invention relates to the field of integrated circuit power consumption reduction technologies. More specifically, the present invention is a power reduction arrangement using lower-voltage, differential signal pairs in electronic signaling.

BACKGROUND OF THE INVENTION

As integrated circuit geometries decrease and gate-counts increase, the power dissipated by integrated circuits is becoming so large that it is difficult to manage. Dissipating the heat is a problem. Supplying such large amounts of power to single chips is a problem. End users would find it very attractive if any particular chip could perform the same function at reduced power requirements.

Power is dissipated in CMOS devices as signals are charged and discharged between the two power rails. Power is a function of the frequency of these charge cycles and the current required for each charge cycle. The frequency cannot be reduced, as it is directly proportional to the processing power of the device. The required current is a function of the capacitance of the elements and the voltage difference between the power rails.

Presently, reductions in power consumption are achieved by reducing the core voltage of the device. Unfortunately, operating voltages cannot continue to be reduced at the same rate in which circuit densities are increasing. This is because the "noise" created by signal switching on data transmission lines lying in close proximity to each other tends to affect the reliability of the transmissions.

This noise originates from the inductive effects of a current moving in a transmission line. A moving current sets up a magnetic field around the conductor. The field consists of a series of concentric circles of influence which are measured in terms of their flux density. As the current in the conductor changes (e.g., as the binary signal being carried by the conductor changes state), the magnetic field associated with that changing current changes also.

Any charged particle existing within a changing magnetic field experiences a force of electromotance proportional to the rate of change of the flux density. This electromotance acting on the charged particle creates an electromotive potential on the particle. This is known as inductance. In the case of a charged particle existing within a conductor adjacent to the conductor setting up the changing magnetic field, all particles in the second conductor feel the electromotive potential. This potential is referred to as electromotive force, or EMF.

The size and nature of the EMF potential acting on the second conductor's signal is a function of the change in the first conductor's signal voltage and it's current. This EMF potential either adds to or subtracts from the ongoing device signal voltage (potential) which has been applied to the second conductor. Addition or subtraction of the two potentials depends on the relative directions of current flow and physical layout of the two conductors.

Thus, the current change caused by a change in binary status (0 to 1, or vice versa) in one line tends to create inductive voltage noise which propagates to adjacent lines. The noise is of a relatively small order of magnitude compared to the affected signal strength (around 1.0V) and the variation does not affect the integrity of the data transmitted. However, if much lower signal voltages were to be used, say on the order of 0.1V, the noise associated with binary status changes in one or more transmission lines could potentially affect the integrity of adjacent signals. This would tend to impact the relatively weaker voltage signals corrupting the data transmitted therein.

Presently, data transmission is accomplished via independent, single-ended signals which swing between the two power rails. Noise created as a result of these signals tends to propagate to adjacent data lines. If two identical signals on two adjacent lines are being transmitted simultaneously, their inductive noise effects tend to be additive. Conversely, if the same two signals are identical except for their polarity (i.e., one signal is driven by a positive voltage and the other a negative voltage) the inductive effects tend to be counter-active.

Problems occur when too many same-polarity signals are transmitted simultaneously, causing a spike in the induced voltages in adjacent lines. FIG. 1 indicates a theoretical prior art arrangement of data transmission lines 1 running between a pair of DSPs being in close proximity to clock signal lines 2. In this arrangement, the clock pulses are simultaneous on each line 2. The cumulative effect of such transmissions may create significant induction in the adjacent data transmission lines, potentially disrupting their signals. A balance in the polarity across most of the clock signals would tend to minimize the inductive effects. At the same time, if such reduced inductive effects could be achieved throughout a device, chip core voltages could be reduced without a corresponding increase in data corruption caused by uncontrolled induction. This lowered core voltage would, in turn reduce the power needed by such device.

Transmission voltages in today's electronic devices are maintained at higher levels than needed to transmit individual signals in an integrated circuit. This is because a high signal drive voltage is needed to differentiate an individual signal from the potentially detrimental noise associated with the great number of densely packed transmission lines in today's devices.

SUMMARY OF THE INVENTION

Therefore, this invention proposes that as many signals as possible within a device be changed to dependent, differential signal pairs where each signal of the differential pair change by a small fraction of the power rail voltage and be opposite in polarity. For example, if the original single-ended signal changed by 1V and the differential pairs each changed by +/−0.1V, it would result in an 80% reduction in power without reducing the performance of the device.

The present invention is beneficial for device designers in the electronics industry by allowing the transmission of binary code within the existing dense physical configurations, which are required to keep electronic components compact, but to do so at reduced voltages without attendant concern for the corruption of adjacent data signals caused by the noise generated from such transmission activity. This would decrease power usage during the transmission of such data.

An arrangement of data transmission within electronic devices is disclosed having an assumed input source signal which is converted by any suitable means to a differential pair of signals for transmission; each signal of the pair having an equal but opposite polarity of propagation voltage.

The coupling of pairs of signals with opposing source voltage polarities provides a situation wherein the potentially cumulative inductive effects associated with the switching of the binary data in the source signal are mitigated by the creation of two equal but opposite and therefore counteractive inductive effects associated with the simultaneous switching in said pair. The net effect is that the noise created by the pair of opposite signals is far less than the noise created by a single signal.

The reduction in noise production from the use of differential signal pairs allows a reduction in the transmission voltages without incurring the aforementioned single-end signal noise corruption of the data transmitted. The lower operating voltages at the same frequency allow data transmission with less power consumption and heat dissipation occurring between sending and receiving components.

Use of this invention provides the advantage of potentially obtaining a tremendous reduction in power dissipation without reducing the performance of the device. It also would allow an increase in the complexity of the device, especially if the method is used in the logical sections of the device such as ALUs, multipliers, etc.

A potential disadvantage of the invention is the requirement to transmit twice as many binary bits per transmission compared to that of a prior art type single-ended signal. However, the effects of the potentially significant power reduction and ability to produce chips with greater circuit densities should offset this small disadvantage.

BRIEF DESCRIPTION OF THE DRAWINGS

Exemplary embodiments of the invention are discussed hereinafter in reference to the following drawings, in which.

DETAILED DESCRIPTION OF PREFERRED EXEMPLARY EMBODIMENTS

The present invention is a power saving arrangement utilizing differential signal pairs to replace single ended binary signals in electronic signal transmission wherever possible throughout a device.

Figure 1:
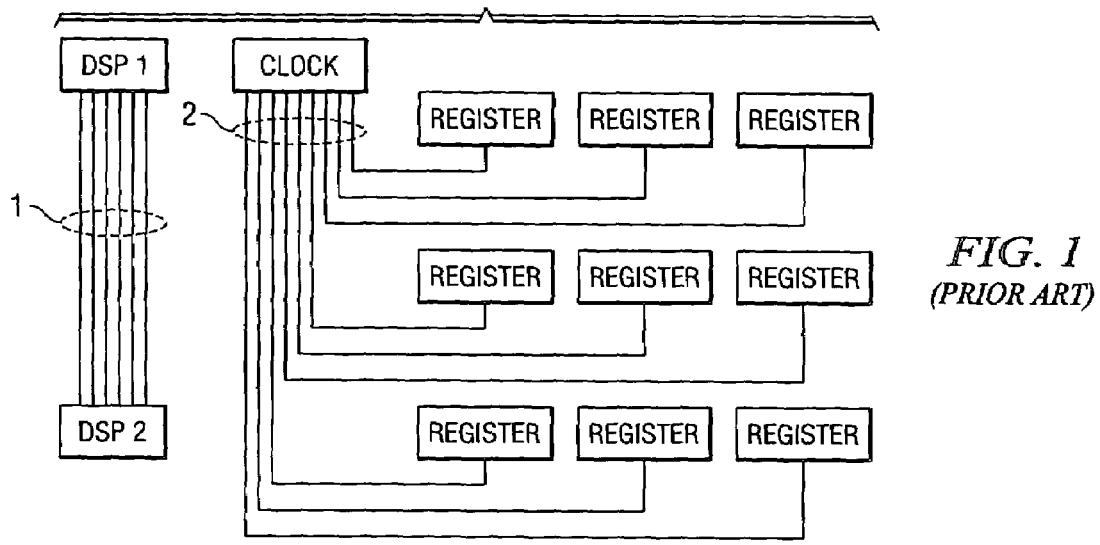
FIG. 1 is a schematic showing a theoretical prior art arrangement of a pair of interfacing DSPs and a bank of storage registers controlled by a synchronizing clock. The data lines between the DSPs are in close proximity to the timing lines from the clock.
Figure 2:
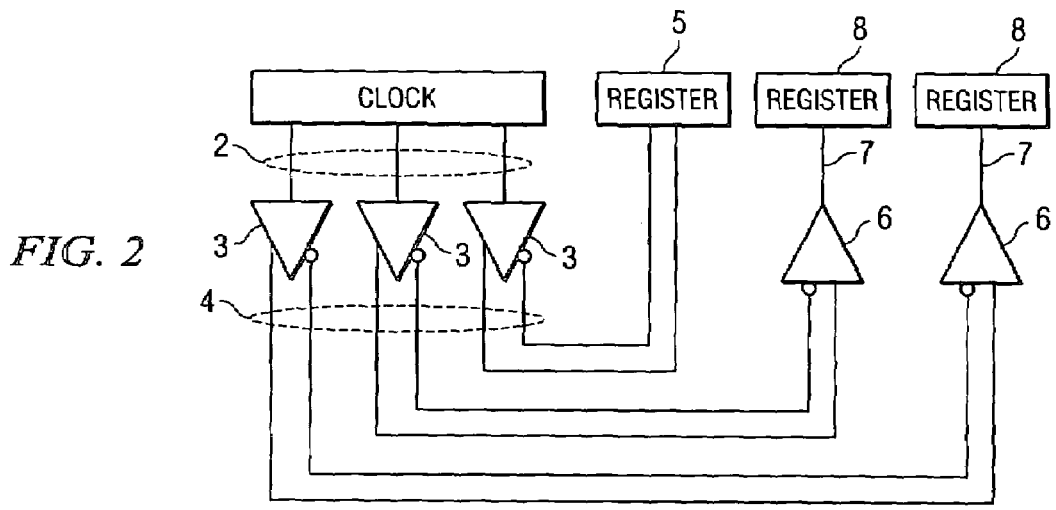
FIG. 2 is a theoretical exemplary schematic of the present invention indicating a clock controlling a bank of registers utilizing pairs of differential signaling.

In an exemplary embodiment of a first aspect of the invention, as illustrated in FIG. 2, an input source signal is driven along any of source signal lines 2 by the device core voltage (say 1.0V). The signal is received first by a differential signal pair generator 3 where it is processed into a pair of differential signals which travel along a pair of transmission lines 4. The differential signal pair is driven by a fraction of the core voltage and the two are of opposite polarity (say, +/−0.1V). The differential pair of signals is transmitted to either its final destination 5, where it is interpreted directly in its paired form, or to a differential pair-to-single end signal converter 6 where it is converted back into a single ended signal transmitted along converted signal line 7 for use at its final destination 8. Signal conversion may be performed via any variety of converters suited to the purpose of returning the differential pair signal back to its original form or to any form usable at the destination.

Figure 3:
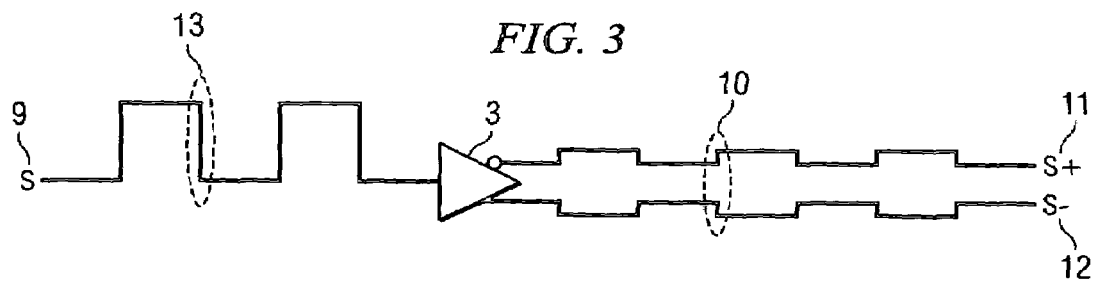
FIG. 3 is a signal diagram depicting a single ended signal being converted to a pair of dependant differential signals.

As indicated in FIG. 3, an input signal S 9 is converted by a differential signal pair generator 3 to a differential (or double-end) signal pair 10. The differential signal pair (10) comprises two symmetrically opposite and operatively dependent signals S+ (11) and S− (12). The two signals (11, 12) are each driven by a relatively low-voltage as compared to the core voltage of present day devices. The drive voltage for each signal is of the same magnitude, but of opposite polarity with respect to a common ground. That is, when the signal S+ (11) is being transmitted as a positive voltage response signal, S− (12) is being transmitted as an equal value, but negative voltage response signal. Thus, the paired signals are equal but opposite in polarity.

In the preferred embodiment, the differential signal pair (10) may be created from a single, relatively higher-voltage and operatively independent (or single-end) transmission signal (13). The pair of signals (10) is transmitted simultaneously at the frequency of input signal (13). Thus, other than their polarity, each signal (11, 12) of a pair is identical, and each transmits changes in binary value coincident with the corresponding input signal changes. Therefore, transmission of the dependent pair (10) may represent the transmission of the source input signal (13).

Because of the symmetry of the opposing signals (11, 12), the electromagnetic noise or inductance associated with binary code status changes of each signal tends to cancel within the pair. Therefore, the pair of signals does not produce appreciable net electromagnetic noise. Even in the event of many simultaneous same-state input signal (13) changes, which would tend to create a detrimental volume of induction-related noise, the creation of the corresponding number of double-end signal pairs (10) would not tend to create such a volume of noise. Thus, with the use of the signal pairs (10), the potential for corruption of adjacent data transmission is reduced.

In an exemplary embodiment of a second aspect of the present invention, paired signals are used extensively throughout the device. Because the potential for the corruption of data is minimized by the noise-canceling effect of the paired signals (10), the drive voltage of each and every paired signal (11, 12) may be kept relatively low without concern for signal corruption.

Voltage levels in each signal of the pair may be a fraction of the input signal or core voltage of the device (say ~+/−0.1V for the paired signals as opposed to say ~1.0V for the core or input signal voltage). This relatively lower voltage of transmission results in an exemplary third aspect of the present invention, a decrease in the power consumption by the device.

The method of creation of the differential signals (11, 12) from a single input signal and the method of use or recombination of the pair of signals for use by the device is well known in the art and therefore not specifically described in the present invention. However, the differential pairs may be created by a differential signal pair generator (3) of any variety common to those skilled in the art. Similarly, the pair of signals may be recombined or utilized in their transmitted form by the receiving component, in any manner or by any means available to those skilled in the art.

Although the exemplary embodiment is illustrated with the double-end signal pairs being created from a single-end transmission signal, any origin of the signal pairs may be used without departing from the scope of the invention.

Similarly, the exemplary embodiment is illustrated with power rail voltages on the order of ~+/−0.1V for each signal in a differential pair and with ~1.0V as the input signal or core device voltage. However, any voltages suitable for use in achieving the noise reduction and power consumption reduction effects under the signal pairing concept herein taught may be used without departing from the scope of the invention.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

The invention claimed is:

1. A method of power consumption reduction within a single integrated circuit, comprising:
   receiving an input source signal into a differential signal pair generator within said integrated circuit;
   processing the input source signal into a first signal and a second signal;
   further processing said first signal and said second signal into a pair of coupled, symmetrically opposite and operatively dependent signals on first and second lines and having line drive voltages in phase and of opposite polarity;
   applying a first one of said drive voltages to said first signal that is an approximate magnitude but of opposite polarity with respect to a common ground reference as a second drive voltage applied to said second; and
   transmitting the first signal and the second signal simultaneously at the frequency of the input signal by transmitting changes in a binary value coincident with the input source signal onto the first and second signals, which creates offsetting fields of electromagnetic interference from the flow of current within their respective conductors;
   receiving both of said signals at a final destination component of said single integrated circuit; and
   utilizing at least one of said signals at said final destination component without recombination of said two signals.

2. An electronic signaling circuit for a processor, comprising:
   a differential signal pair generator that receives an operatively independent signal and processes the single-ended signal into a first operatively dependent signal on a first signal line and a second operatively dependent signal on a second signal line, and transmits the first dependent signal and the second dependent signal simultaneously at the frequency of the operatively independent signal;
   wherein a source drive voltage used by the core of the integrated processor drives the independent signal and is converted by differential signal pair generator to a lower voltage on the second dependent signal line that is an approximate magnitude of, but of opposite polarity to, a drive voltage converted by the differential signal pair generator onto the first dependent signal line; and
   a final destination component for receiving both of said dependent signals and utilizing at least one of said dependent signals at said final destination component without recombination of said dependent signals.

3. An integrated circuit, comprising:
   a source signal line carrying an input source signal that is driven by a voltage of the integrated circuit;
   a differential signal pair generator, operatively connected to the source signal line, that receives the input source signal and processes the input source signal into a first operatively dependent signal on a first signal line and a second operatively dependent signal on a second signal line and transmits the first dependent signal and the second dependent signal simultaneously at the frequency of the source signal;
   wherein the core voltage of the source signal is converted by the differential signal pair generator to a voltage on the second dependent signal line that is an approximate magnitude of, but of opposite polarity to, a drive voltage converted by the differential signal pair generator onto the first dependent signal line;
   a final destination component for receiving both of said dependent signals and utilizing at least one of said dependent signals at said final destination component without recombination of said dependent signals.

4. The integrated circuit of claim 3, wherein the source signal drive voltage is a drive voltage from the core of the integrated processor.

5. The integrated circuit of claim 3, wherein the first and the second operatively dependent signals transmit changes in a binary value coincident with the source input signal onto the first and second signal lines.

* * * * *